(12) United States Patent
Brosofsky et al.

(10) Patent No.: US 6,539,588 B1
(45) Date of Patent: Apr. 1, 2003

(54) BREAKAWAY LANYARD WITH ADJUSTABLE MOUNTING ELEMENT

(75) Inventors: Robert N. Brosofsky, Nashua, NH (US); Richard M. Raia, Lexington, MA (US)

(73) Assignee: Comprehensive Identification Products, Inc., Burlington, MA (US)

( * ) Notice: Subject to any disclaimer, the term of this patent is extended or adjusted under 35 U.S.C. 154(b) by 0 days.

(21) Appl. No.: 09/677,295

(22) Filed: Oct. 2, 2000

Related U.S. Application Data

(60) Provisional application No. 60/157,812, filed on Oct. 4, 1999, and provisional application No. 60/166,245, filed on Nov. 18, 1999.

(51) Int. Cl.⁷ .............................................. A44B 11/04
(52) U.S. Cl. .............................. 24/3.4; 24/3.1; 24/165; 24/3.12; 24/600.9
(58) Field of Search ........................... 24/3.1, 3.2, 3.4, 24/3.6, 3.12, 165, 265 AL, 598.4, 600.9, 601.2, 602; 2/416–421; 119/863, 864

(56) References Cited

U.S. PATENT DOCUMENTS

| | | | | |
|---|---|---|---|---|
| 222,491 A | * | 12/1879 | Hampton ...................... | 24/165 |
| 821,856 A | * | 5/1906 | Carroll .......................... | 24/165 |
| 4,461,044 A | * | 7/1984 | Reiterman et al. ............. | 2/421 |
| 4,665,592 A | * | 5/1987 | Kasai ........................ | 24/601.2 |
| 4,691,416 A | * | 9/1987 | Nakayama et al. ......... | 24/114.9 |
| 5,027,477 A | | 7/1991 | Seron ............................ | 24/3 B |
| 5,092,018 A | | 3/1992 | Seron ............................ | 24/3 B |
| 5,244,135 A | * | 9/1993 | Nelson ....................... | 24/3.1 X |
| 5,443,039 A | * | 8/1995 | Suchowski ................... | 119/865 |
| 5,640,742 A | * | 6/1997 | White et al. ................. | 24/3.12 |
| 5,701,849 A | * | 12/1997 | Suchowski et al. ......... | 119/865 |
| 5,706,560 A | * | 1/1998 | Anscher et al. ....... | 24/30.5 P X |
| 5,722,125 A | * | 3/1998 | Vasilopoulos ............ | 24/3.13 X |
| 5,967,415 A | * | 10/1999 | Utter ........................... | 239/152 |
| 6,161,266 A | * | 12/2000 | Anscher ................... | 24/3.6 X |

\* cited by examiner

*Primary Examiner*—Robert J. Sandy
*Assistant Examiner*—Ruth C. Rodriguez
(74) *Attorney, Agent, or Firm*—Ernest V. Linek; Banner & Witcoff, Ltd.

(57) ABSTRACT

According to one embodiment of the present invention, there is provided a lanyard construction, which includes a strap forming a closed loop of flexible material adapted to be disposed about a part of a human body. An adjustable mounting element, preferably either a slide hook assembly or a universal slide attachment, is on the loop. This mounting element is used for mounting an object to be displayed or used by the wearer of the lanyard. Finally, the lanyard construction of the present invention includes a breakaway member which defines a weak point in the strap whereat the loop may open and be pulled free from the wearer. In the present invention, the user of the lanyard selects the best location for separation of the weak point from the mounting element about the periphery of the lanyard loop. Such a location may be behind the wearer's neck, or it may be some location closer to the mounting element. The user is provided with the ability to determine the best location for placement of the mounting element relative to the breakaway member, by merely moving the mounting element along the periphery of the lanyard loop.

16 Claims, 9 Drawing Sheets

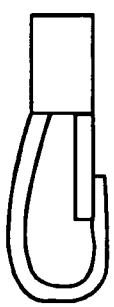
FIG. 11A
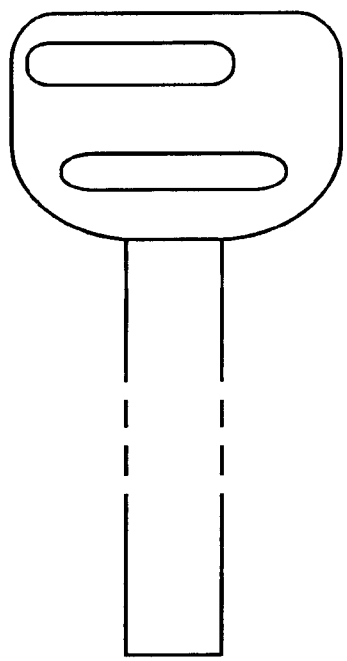 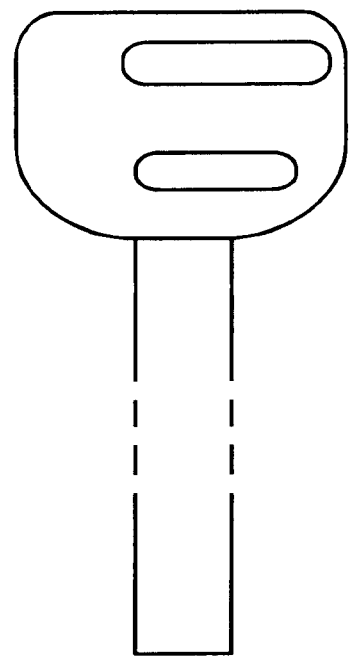
FIG. 11B                                    FIG. 11C

BREAKAWAY LANYARD WITH ADJUSTABLE MOUNTING ELEMENT

CROSS-REFERENCE TO RELATED APPLICATIONS

This application claims priority under 35 U.S.C. §119 from two abandoned provisional applications, U.S. Ser. No. 60/157,812, filed Oct. 4, 1999 and U.S. Ser. No. 60/166,245, filed Nov. 18, 1999, the disclosures of which are hereby incorporated herein by reference.

FIELD OF THE INVENTION

This invention relates to an assembly that includes a strap that is adapted to be placed about a body part, such as a lanyard or the like.

BACKGROUND OF THE INVENTION

There are many types of articles that include a strap to be worn about a part of the body, which may be generically termed lanyards and may include loop-like elements worn about the neck or the wrist and even belts worn about the waist. In many cases, these lanyards are fitted with some sort of a mounting element such that another article may be attached to the strap. For example, identification cards may be affixed to lanyards such as belts or loops worn about the neck. Sports officials frequently will attach whistles to loops worn about the neck or wrist.

While such uses of lanyards are advantageous, they are not without their drawbacks. For example, a worker around machinery and wearing an identification card, as is a fairly common occurrence, attached either to a belt or to a loop worn about the neck, can be severely injured if the loose identification card attached lanyard becomes caught in the machinery and pull the worker into the machinery. Similarly, unruly fans at sporting events might grab a sport official's whistle or the like such that injury could occur to the sports official if he could not break away from the fan.

Seron in U.S. Pat. Nos. 5,027,477 and 5,092,018 discloses one type of breakaway lanyard, the disclosures of which are hereby incorporated herein by reference. The lanyard of the two Seron patents consists of a strap forming a closed loop of flexible material adapted to be disposed about a part of a human body, a mounting element on the loop at a fixed location thereon for mounting an object to be displayed or used by the wearer of the lanyard, and a breakaway element defining a weak point whereat the loop may be open and be pulled free from the wearer. The weak point is always located remotely from the mounting element. Seron claims that this spaced apart relationship is a critical feature of his invention.

Seron's use of a "fixed location " to permanently space the mounting element at a location remote from the breakaway point can be a problem for some users and one solution to the problems associated with such a fixed spacing relationship would be to make the mounting element a free-floating device, thereby allowing the mounting element to freely rotate about the lanyard. At least one such breakaway lanyard is presently commercially available. However, the free floating mounting element has its own drawbacks, including one shared with the Seron device; namely, it does not give the wearer of the lanyard the ability to decide where the mounting element should best be positioned in relationship to the breakway point. As described above, Seron's device preselects the location and fixes it permanently, giving the user a "single-choice" option. The free-floating device gives the user no options at all.

As taught herein below, the present invention alleviates this drawback of the prior art devices by making the mounting element user adjustable. If desired, the breakaway point can be sited close to the mounting element, or it can be sited far away from the breakaway point. Similarly, it can be user selected at any position there between.

SUMMARY OF THE INVENTION

The present invention is directed to a new and improved lanyard construction that may readily breakaway. In the present invention the mounting element, which includes a hook assembly whereby an object may be secured to a strap or a lanyard, is user adjustable as to the distance it may be spaced from the breakaway fixture, which is included as a safety release during the use of the lanyard.

In the present invention the user of the lanyard can move the mounting element to any desired position about the loop of the lanyard. Unlike the free-floating mounting element of the prior art, the mounting element of the present invention is adjustable, in that it may be moved along the length of the lanyard, by application of minimal force. Advantageously, once a location is selected the mounting element is held in place by frictional interaction between the lanyard material and the construct of the mounting element. Unlike the Seron devices, this location is not fixed, as the user, of the lanyard is free to change the location of the mounting element at will.

Thus, according to one embodiment of the present invention, there is provided a lanyard construction, which includes a strap forming a closed loop of flexible material adapted to be disposed about a part of a human body. An adjustable mounting element is on the loop. This mounting element is used for mounting an object to be displayed or used by the wearer of the lanyard. Finally, the lanyard construction of the present invention includes a breakaway member which defines a weak point in the strap whereat the loop may open and be pulled free from the wearer. In the present invention, the user of the lanyard selects the best location for separation of the weak point from the mounting element about the periphery of the lanyard loop. Such a location may be behind the wearer's neck, or it may be some location closer to the mounting element. The user is provided with the ability to determine the best location for placement of the mounting element relative to the breakaway member, by merely moving the mounting element along the periphery of the lanyard loop.

According to a preferred embodiment of the invention, the breakaway member comprises interengaging male and female parts on each end of the lanyard loop. Connections of this type are common in the prior art, and when joined together, a continuous loop is formed. Mounted on this lanyard loop is an adjustable mounting element, two of which are described in greater detail below.

While the Seron patents describe a male/female breakaway member that is functional, it is believed that the preferred breakaway member of the present invention is superior thereto. Accordingly, in a most preferred embodiment of the present invention, the breakaway member includes a male fixture, which has a protruding, rigid member having a pair of opposed notches adapted to releasably engage with detents provided in the corresponding female fixture. The simplicity of the present design in comparison to the prior art devices shows the superiority of the present breakaway member.

As described above, the lanyard of the present invention finally includes an adjustable mounting element, which permits the user of the lanyard to select the best location for both the breakaway member and the mounting element and the object (or objects) held thereby. Unlike prior art lanyards, such as Seron, the lanyard of the present invention is "user adjustable" and has been designed to slide to any position on the lanyard, thus allowing the breakaway component to be positioned in the most ideal location based on individual user needs and preferences.

In one preferred embodiment of the present invention, the adjustable portion of the lanyard is provided by a "Slide Hook™" mechanism. The Slide Hook member is a molded plastic, user adjustable component, which comprises a combination of a hook unit and a slide unit. The hook unit holds the desired object, while the slide unit allows the entire mechanism to be moved by the wearer to any position on the lanyard, thus allowing the breakaway component to be positioned in the most ideal position based on individual user needs and preferences. The hook unit on the Slide Hook opens to receive and support many items for display such as employee ID Cards, keys, whistles, etc.

In another preferred embodiment of the present invention, the adjustable portion of the lanyard is provided with a "Universal Slide Attachment™" mechanism. The Universal Slide Attachment is another user adjustable component feature which has been designed to slide to any position on the lanyard, thus allowing the breakaway component to be positioned in the most ideal position based on individual user needs and preferences. The Universal Slide Attachment comprises molded, snap-together, posi-lok plastic jaws to receive and hold many related components such as key rings, badge clips, swivel hooks, "J" hooks, etc., depending on the precise application.

The lanyard of the presents invention offers the followings improvements over previously known lanyard designs:

(1) Positioning of the breakaway component in the most ideal position on lanyard strap based on individual user needs and preferences by moving Slide Hook or Universal Slide Attachment at will.

(2) Advanced design keeps ID Cards or Badges from twisting and turning—cards and badges are forced to lie flat against the body for proper display and viewing.

(3) Adjustability allows individual users to position breakaway component at ideal position based on individual user body size, height, and the specific application (i.e., nurses prefer breakaway component to be behind neck to prevent an agitated patient from grabbing the lanyard at the breakaway component location, thus preventing the lanyard from actually breaking away, etc.)

BRIEF DESCRIPTION OF THE DRAWINGS

FIGS. 11A, 11B and 11C are a side view, front view, and back view respectively, of the Slide Hook mounting element of the present invention;

DETAILED DESCRIPTION OF THE PREFERRED EMBODIMENTS

Figure 1:
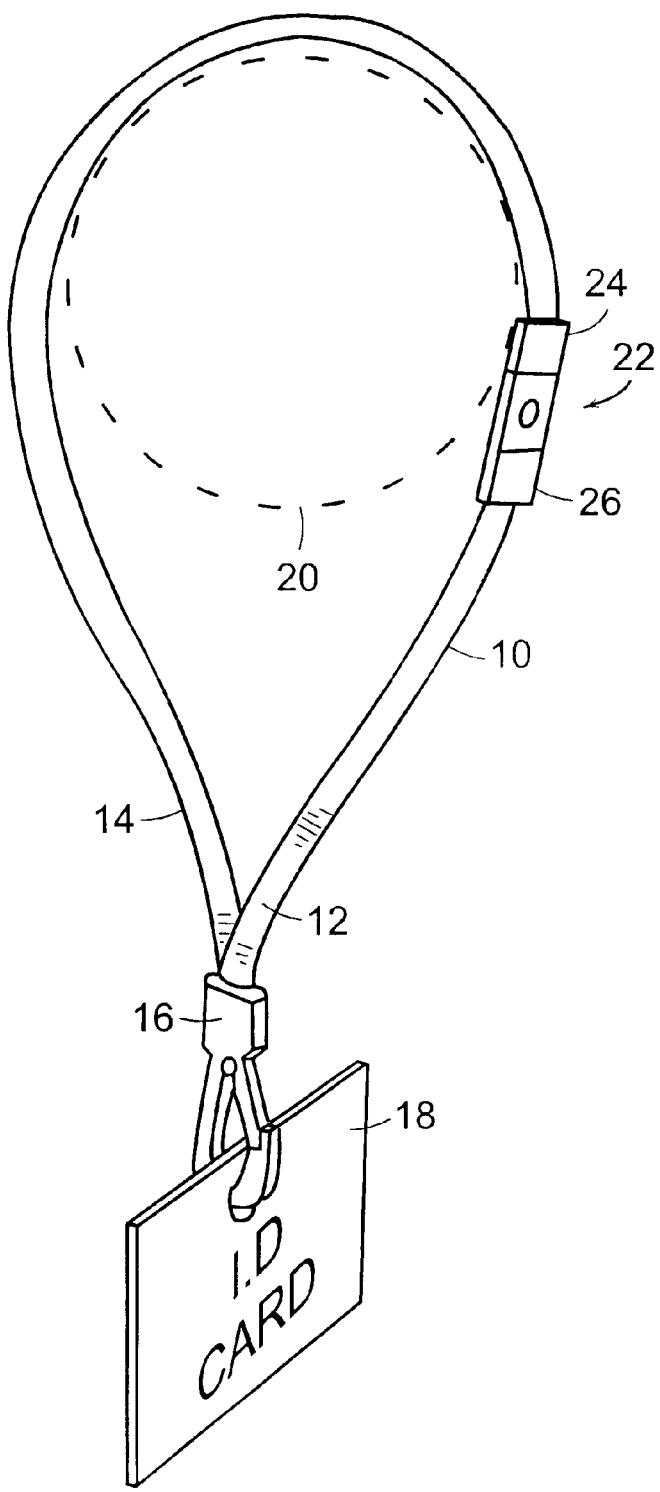
FIG. 1 shows the prior art (Seron) breakaway lanyard.

A lanyard made according to the present invention will be similar to the prior art lanyard exhibited in FIG. 1, in that each includes an elongated strap 10 of flexible material such as plastic or cloth. However, numerous differences will be apparent when one compares the details of the prior art lanyard against the details of the present invention.

In the prior art embodiment, two ends 12 and 14 of the strap 10 come together and are joined to a mounting element in the form of a hook 16. The hook 16 may be utilized to mount, for example, an identification card 18, to the strap 10. Typically, with the strap ends 12 and 14 brought together, a closed loop is formed as illustrated in FIG. 1, which may be placed about some part of the body of the wearer. In the embodiment illustrated, the neck 20 of an individual wearing the lanyard is shown in dotted lines. However, it is to be understood that the lanyard can be worn around the waist, wrist, etc. It is also to be understood that other forms of mounting elements other than hooks may be utilized in lieu of the hook 16 and that objects other than identification cards such as the card 18 may be mounted thereto.

The prior art lanyard, like the lanyard of the present invention, included a weak point in the lanyard loop, which in each case is defined by a breakaway fixture, designated 22 in FIG. 1. The breakaway fixture 22 includes inter-engaging male and female parts 24 and 26 that may separate to allow the strap 10 to be pulled free from the part of the human body about which it is placed.

Figure 2:
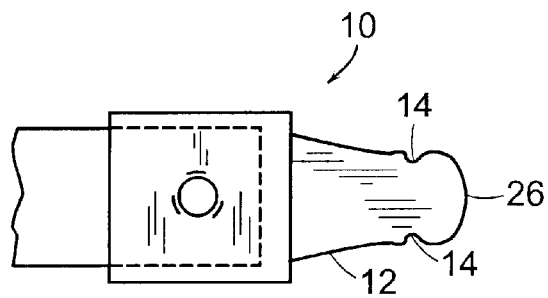
FIG. 2 shows one preferred male fixture of the breakaway feature of the present invention.
Figure 3:
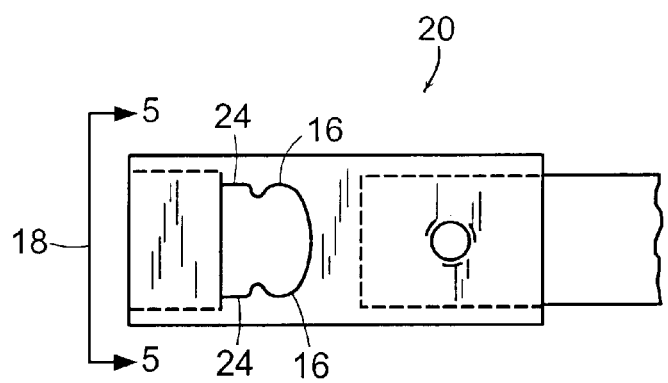
FIG. 3 shows the preferred female fixture, which corresponds, to the male fixture of FIG. 2.

In the prior art device of FIGS. 1–3, the breakaway assembly 22 is required to be located at a point remote from the fixed location on the strap 10 whereat the mounting element or hook 16 is located. According to the teachings of the prior art, when the lanyard is intended to be worn about the neck, it is preferable that the breakaway assembly 22 be disposed to be at the side of the neck as seen in FIG. 1.

The present inventors have discovered that this spaced apart relationship is not suitable for all lanyard users, and that by providing the user with the ability to adjust exactly where the mounting element and the breakaway assembly need to be in the particular circumstances of a given user, the product is more acceptable. As opposed to the prior art device, the lanyard of the present invention is "user friendly."

Figure 1A:
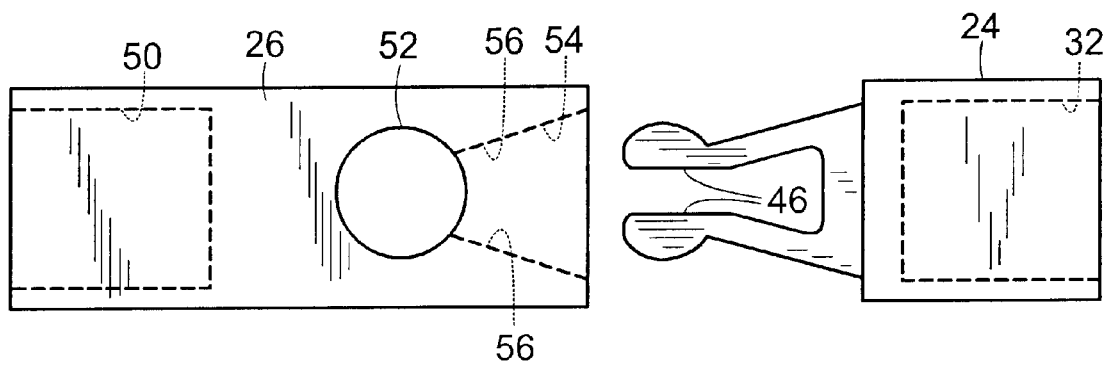
FIGS. 1A and 1B show details of the breakaway feature of the prior art, lanyard of FIG. 1.
Figure 1B:
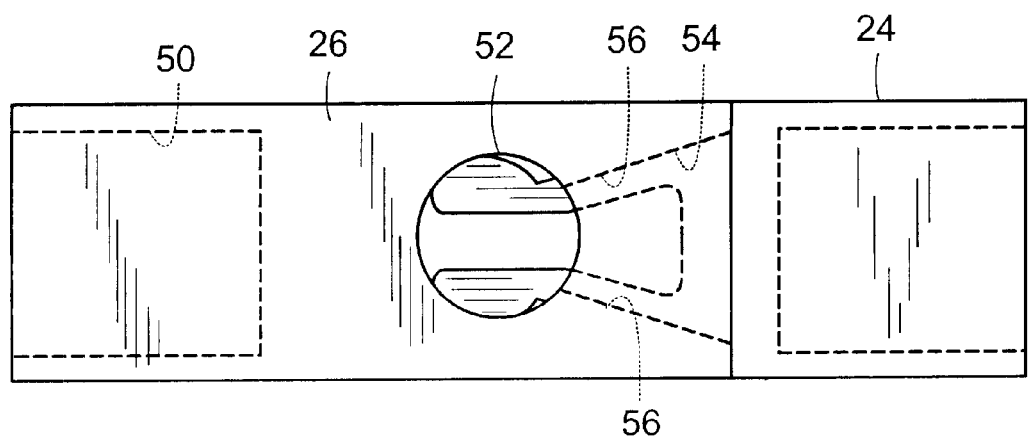
Figure 4:
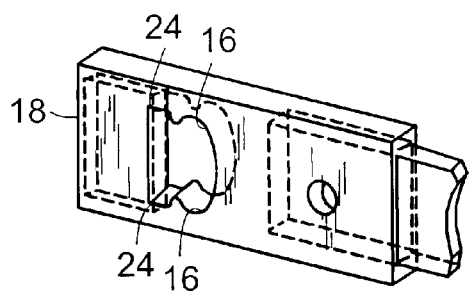
FIG. 4 is a perspective view of the female fixture of FIG. 3.

FIGS. 1A and 1B are adapted from FIGS. 2 and 4 of the prior art Seron ('477) Patent. The reference numerals from the '477 Patent have been used. FIG. 1A illustrates the male and female fixtures prior to engagement while FIG. 1B illustrates the male and female fixtures engaged.

Referring to the reference numerals in FIGS. 1A and 1B, the male fixture is described at column 3, lines 22 to 38 of the '477 Patent as:

The male fixture 24 includes a base in the form of a rectangular solid of plastic or the like. The base 30 includes an interior.recess 32; which is adapted to receive an end of the strap 10 which may be glued, or solvent welded therein.

Opposite of the recess 32, the base 30 includes a bifurcated projection, generally designated 34, terminating in a circular tip 36. In the preferred embodiment of the invention, two fingers 38 and 40 integrally formed on the base 30 and each terminating in a semi-circular end 42 define the projection 34. The ends 42 are not strictly semi-circular, being provided with rounded noses 44 for purposes to be seen.

The facing edges of the fingers 38 and 40 are defined by parallel edges 46 at the semi-circular ends 42 which then merge into a triangular recess 48 that extends almost back to the base 30.

Therefore, the only structure recited in the specification as to the male fixture is of a base including a bifurcated projection terminating in a circular tip and, preferably, two fingers integrally formed on the base and each terminating in a semi-circular end define the projection.

Referring to the reference numerals in FIGS. 1A and 1B, the female fixture is described at column 3, lines 39 to 61 of the '477 Patent as follows:

The female fixture 26 is also in the form of a rectangular solid, also of plastic, and includes a strap receiving recess 50 identical to the recess 32. Oppositely of the recess 50, the female fixture includes a circular opening 52, which thus defines a circular interior recess within the fixture 26. A mouth 54 extends from the end of the fixture 26 opposite the recess 50 inwardly to the circular recess 52 and is defined by converging sidewalls 56. The sidewalls 56 are shaped and angled so as to snugly receive the fingers 38 and 40.

It will be noted that where the mouth 54 joins the recess 52, the side walls 56 are spaced apart a distance less than the diameter of the circular tip 36 but are sufficiently wide so that the walls 56 may cam the semi-circular ends 42 towards each other and allow circular tip 36 to enter the recess 52 and return to its normal configuration to secure two fixtures together. The rounded hoses [sic, noses] 44 facilitate this mode of assembly.

When a separating force is applied to the fixtures 24 and 26, the circular shape of the recess 52 and the tip 36 allows the fingers 38, and 40 to be cammed towards each other such that the projection 34 may be pulled free from the recess 52 and the mouth 54 thereof.

Figure 5:
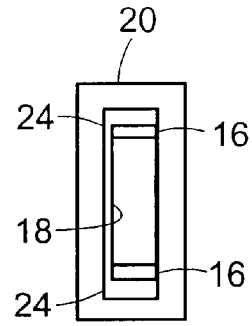
FIG. 5 is an end view of the female fixture of FIG. 3.

FIG. 2 shows one preferred male fixture of the present invention and FIGS. 3 thorough 5 show the corresponding preferred female fixture. In FIG. 4 there is illustrated a perspective view of FIG. 3. FIG. 5 is an end view of the female fixture in FIG. 3.

The preferred breakaway mechanism of this invention thus includes a male fixture 10, shown in FIG. 2, which removably engages within an open end 18 of a female fixture 20 shown in FIGS. 3 through 5. More specifically, the male fixture has a protruding, rigid member 12 having a pair of opposed notches 14 that releasably engage detents 16 of the female fixture 20. Member 12 terminates in a semi-circular end 26.

The female fixture 20 includes parallel walls 24 which are positioned adjacent to the detents 16. Detents 16 are integrally molded with walls 24. Semi-circular end 26 of the male fixture is wider than the opening between detents 16. As a result, when the user forces rigid member 12 into opening 18, the semi-circular end 26 forces detents 16 slightly apart such that the semi-circular end 26 can move past the detents and the detents can releasably engage with notches 14.

Figure 6:
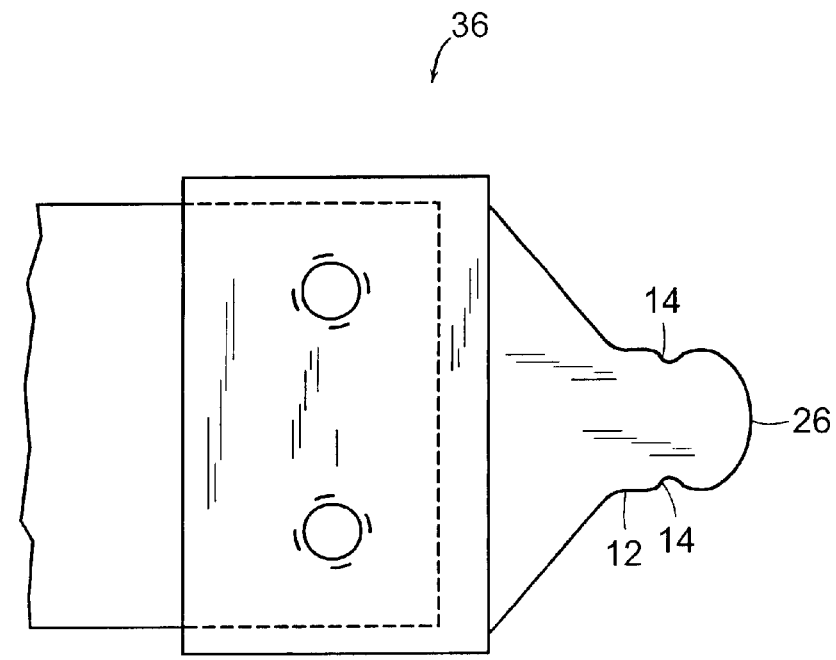
FIG. 6 shows another preferred male fixture of the breakaway feature of the present invention.
Figure 9:
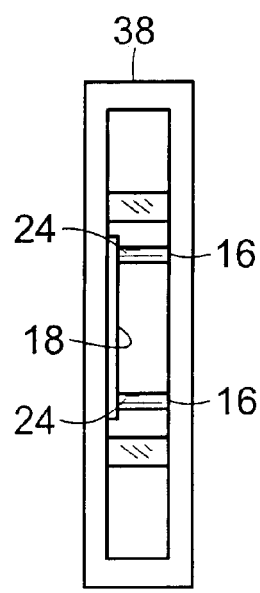
FIG. 9 is an end view of the female fixture of FIG. 7.

Another preferred breakaway mechanism of the present invention is shown in FIGS. 6 and 9 wherein like numerals refer to the same or similar elements identified above with respect to the embodiment of FIGS. 2–5.

Figure 7:
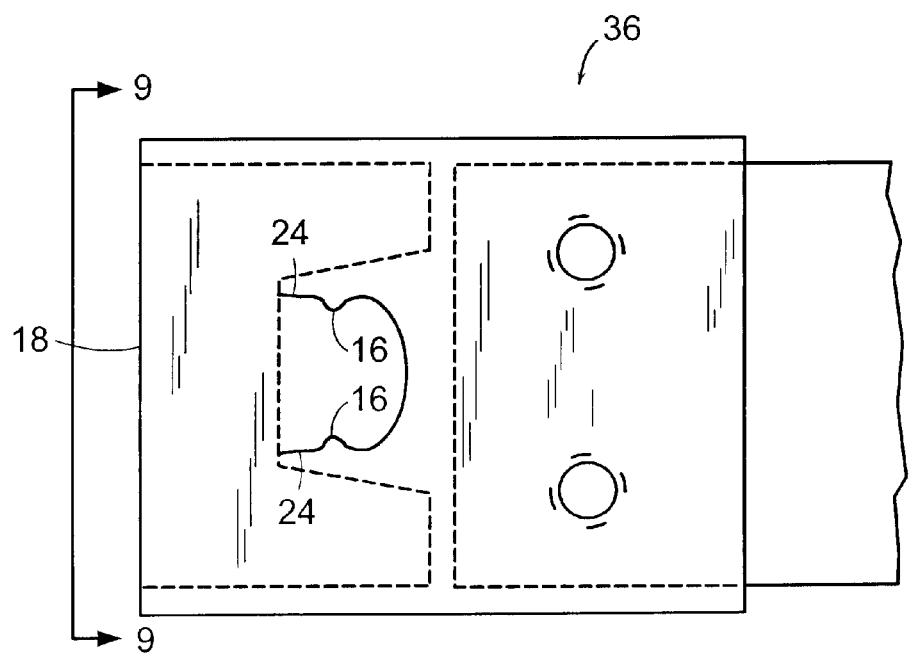
FIG. 7 shows the preferred female fixture that corresponds to the male fixture of FIG. 6.
Figure 8:
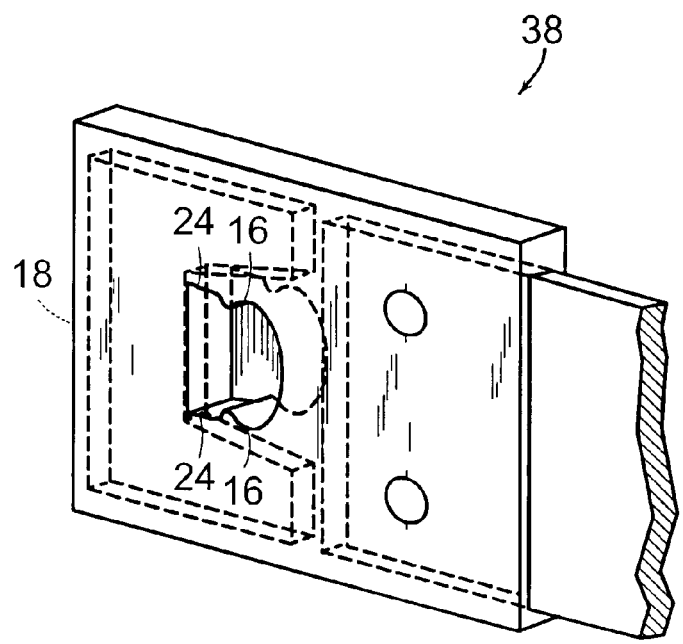
FIG. 8 is a perspective view of the female fixture of FIG. 7.

FIG. 6 shows another preferred male fixture and FIGS. 7 through 9 show the corresponding female fixture, with FIG. 8 illustrating a perspective view of FIG. 7. FIG. 9 is the end view of FIG. 7.

As illustrated therein, the male fixture 36 includes rigid member 12, notches 14, and semi-circular end 26. The female fixture 38 includes detents 16 and walls 24. The male fixture 36 is inserted into the female fixture 38, wherein the semi-circular end 26 forces detents 16 slightly apart such that the semi-circular end 26 can move past the detents and the detents can releasably engage with notches 14.

Thus, the entry of the male fixture is achieved in the present invention by the moving apart of the detents of the female fixture and the locking or engagement of the fixtures is achieved by the action of the detents in the female fixture. As a result, the preferred breakaway features of the present invention both include a releasable male/female engagement in which the male fixture is fixed and does not compress while the female fixture expands to receive the male fixture and is not fixed.

Figure 10A:
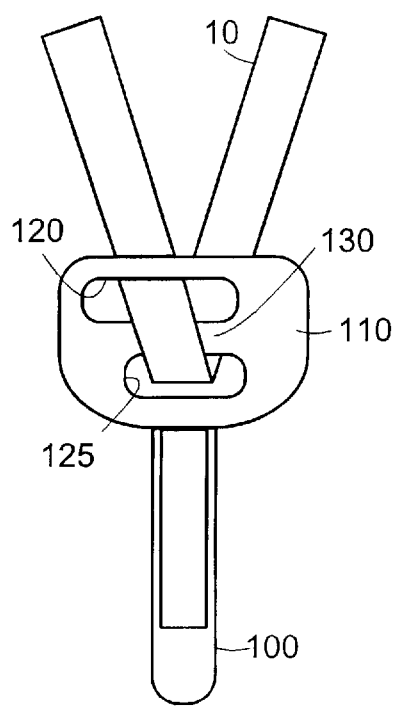
FIGS. 10A and 10B are front and back perspective views respectively of the Slide Hook embodiment of the mounting element of the present invention.
Figure 10B:
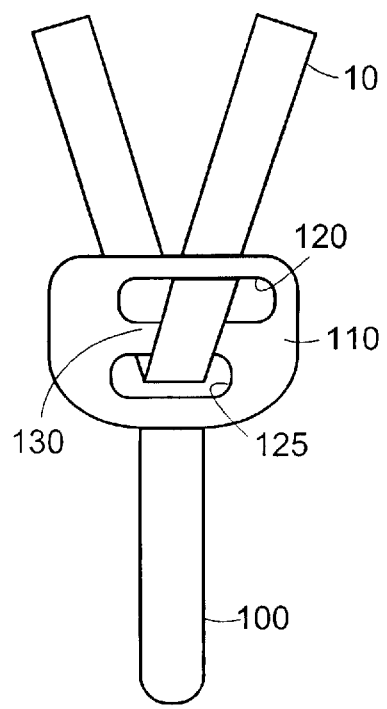

FIGS. 10A and 10B illustrate one embodiment of the adjustable mounting element of the present invention. As illustrated therein, the mounting element is an integral unit comprising a hook member 100 and a sliding member 110. The sliding member is provided with two offset and spaced apart slots 120 and 125, thereby forming the friction bar 130 there between. Lanyard strap 10, a fleixible material such as plastic or cloth, is passed through slot 120, over the friction bar 130, and back through slot 125, creating the adjustable mounting element of the present invention.

FIGS. 11A, 11B and 11C illustrate the currently preferred molded plastic version of the adjustable mounting element, and the dimensions thereof. Variations in these dimensions may be required to accommodate lanyard materials of different dimensions, but the current embodiment is quite versatile.

As described above, the mounting elements of the present invention are connected to a sliding mechanism, through which the material forming the lanyard loop is passed. Frictional interaction between the material of the lanyard loop and the sliding mechanism allows the user to position the mounting element at any desired location. The amount of force required to move the mounting element can be controlled during the manufacturing process, and can be varied from light (almost no force required) to heavy (much effort required). Advantageously the amount of force is moderate, which can be controlled both by the fabric chosen for the lanyard loop and/or the structure of the sliding mechanism. Some friction is required to allow the user to select a position for the sliding mechanism at some distance from the breakaway members. If the connection is essentially friction-free, the sliding mechanism will not be capable of maintaining the user-selected position.

In one preferred embodiment of this invention, the sliding mechanism and the hook are an integral unit, with the sliding mechanism located opposite the hook member. The sliding mechanism in this embodiment has a section with two closely spaced but offset slots passing there through. The spacing of the slots leaves a friction member between the two slots. The material forming the lanyard loop is passed through one slot, over the friction bar and then through the other slot, forming the desired adjustable mounting element. If desired, the hook and sliding mechanism may include means for rotation of the hook member.

The adjustable mounting element of FIGS. 11A, 11B and 11C is an integral molded plastic (e.g., polypropylene) part. The design has been selected to allow the lanyard material to slide through the cutout portions easily, without pulling on the material. Advantageously all internal surfaces exposed to material are rounded to prevent snags. The minimum wall thickness for the illustrated embodiment is 0.064 inches on all sides. The top cutout (120) and bottom cutout (125) are offset to opposite sides of the slide member. Preferably, as illustrated, the bottom cutout (125) is centered, from side to side on the slide member portion of the mounting element. The preferred cutout dimensions are 0.07 inches×0.040 inches. All other dimensions may be adjusted to accommodate the cutout dimensions and desired wall thickness (0.064 inches). The preferred hook dimensions are indicated on FIGS. 11B and 11C.

Figure 12:
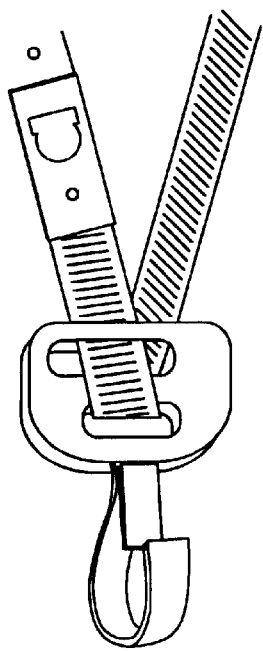
FIGS. 12, 13 and 14 illustrate the similarities of the Slide Hook mounting element (FIG. 12) and two versions of the Universal Slide Attachment mounting element; one with a swivel hook (FIG. 13) and one with a bulldog clip (FIG. 14)
Figure 13:
Figure 14:

As shown in FIGS. 12, 13 and 14, the Universal Slide Attachment (FIGS. 13 and 14) is very similar in form to the Slide Hook of FIG. 12. One advantage of these devices is apparent from these drawings; namely the flat positioning of the hook or holder, which is mandated by the design of these holding devices. Each of the illustrated embodiments will hold at least one identification card or the like, flat against the body of the user. There is no likelihood of twisting which is often experienced with prior art type holding devices. In this embodiment, the objects held are maintained in a plane that is parallel to the body of the holding device and that plane is parallel to the body of the wearer, when the lanyard is worn around a person's neck.

As illustrated in FIGS. 13 and 14, the Universal Slide Attachment embodiment of the present invention will accept a number of different devices for holding cards or the like, including a bull-dog clip, swivel hook, and the like. If desired, no additional holding devices need be used, as the Universal Slide Attachment can be used to directly hold one or more cards or other objects such as whistles, writing instruments, and the like.

FIGS. 15, 16, and 17A–17C illustrate one preferred embodiment of the Universal Slide Attachment in detail, fully illustrating the differences between these holding devices.

Figure 15:
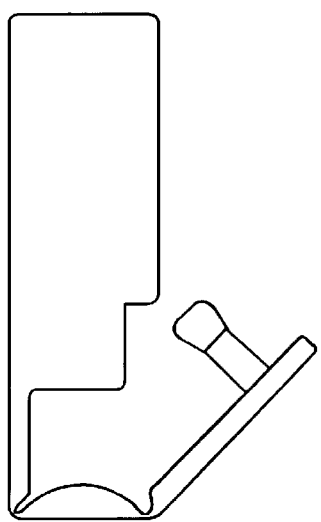
FIGS. 15 and 16 illustrate the Universal Slide Attachment mounting element in the closed position; in a side elevational view (FIG. 15) and in a cross-sectional view (FIG. 16)
Figure 16:
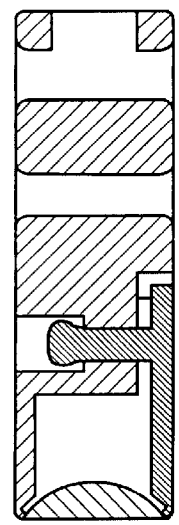

As illustrated in FIGS. 15 and 16, the Universal Slide Attachment is a molded plastic part (e.g., polypropylene or the like), which utilizes a pair of living hinges to allow the closure of the device into the main body. A cavity is located in the lower part of the main body, which has been sized to accept and releasably hold the closure finger. This is best illustrated in the cross-sectional view of FIG. 16. The upper portion of the main body has offset slots for receipt of the lanyard material, allowing the easy movement of the Universal Slide Attachment to any desired position on the lanyard loop. This portion of the Universal Slide Attachment is designed in the same manner as the corresponding upper portion of the slide Hook Assembly of FIGS. 10A, 10B, and FIGS. 11B and 11C.

Figure 17A:
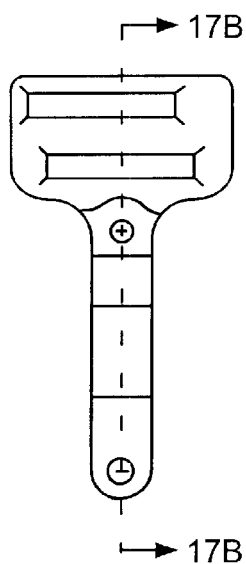
FIG. 17A illustrates the Universal Slide Attachment mounting element in the open position as a front elevational view.
Figure 17B:
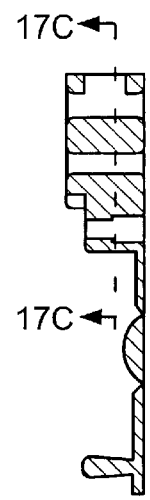
FIG. 17B is a cross-sectional view of the Universal Slide Attachment of FIG. 17A, taken along the section line B—B.
Figure 17C:
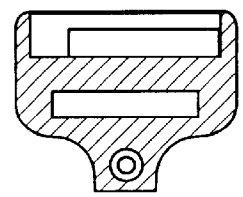
FIG. 17C is a cross-sectional view of a portion of the Universal Slide Attachment of FIG. 17B, taken along the section line A—A.

FIGS. 17A, 17B and 17C provide further details regarding the Universal Slide Attachment. In FIG. 17A, the attachment is shown from the front face, in the open position. The two offset slots for receipt of the lanyard material are shown in the upper body and the closure member is shown at the lower portion. FIG. 17B is a cross-sectional view of FIG. 17A, taken along section line B—B. FIG. 17C is a cross-sectional view of the upper portion of FIG. 17B, taken along section line A—A.

It will be appreciated that the present invention provides a unique and simple but highly effective breakaway assembly as well as an adjustable mounting element in the form of a one-piece plastic hook and sliding member. Through the use of sonic welding, adhesive or solvent welding, the strap ends may be readily but strongly bonded to the two ends of the breakaway member. Alternatively, other known breakaway combinations could be employed herein, including for example, hook and loop elements (e.g., Velcro®), flexible rubber or plastic tubing with removable solid inserts, and the like. Such members are well known in this art.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A lanyard construction comprising;
    a strap forming a closed loop of flexible material for disposal about a part of a human body;
    an adjustable position mounting member attached to said loop and adapted for mounting a separate object to be displayed or used by the wearer of the lanyard;
    wherein the mounting member comprises a body with two horizontally offset and vertically spaced apart slots, thereby forming friction bars between the slots at the front and back of the body, said friction bars allowing the strap to adjustably slide through the slots under tension; and
    a breakaway assembly defining a weak point in said loop, whereat said loop may open and be pulled free from the wearer.

2. The lanyard of claim 1, wherein the horizontally offset and vertically spaced apart slots in the mounting member cause the mounting member to lie flat against the human body.

3. The lanyard of claim 1, wherein the horizontally offset and vertically spaced apart slots in the mounting member cause objects held by the mounting member to be maintained in a plane that is parallel to the body of the mounting member, wherein that plane is parallel to the body of the wearer when the lanyard is worn around a person's neck.

4. The lanyard of claim 1, wherein said breakaway assembly comprises interengaging male and female parts.

5. The lanyard of claim 4, wherein the male part comprises a rigid member with at least one side notch, and a semi-circular end portion.

6. The lanyard of claim 5, wherein the female part comprises a slot in a wall, the side of which includes at least one detent.

7. The lanyard of claim 1, wherein the mounting member further comprises a slide hook assembly comprising a hook member attached to a sliding members.

8. The lanyard of claim 7, wherein the hook member and the sliding member comprise an integral unit.

9. The lanyard of claim 1, wherein the mounting member further comprises a universal slide attachment comprising a hinged extension member emanating from the body, wherein the distal end of the extension member includes a closure member which is adapted for closure of the extension member with a corresponding member in the main body, forming an attachment point for one or more other objects.

10. The lanyard of claim 9, wherein the extension member and the main body of the universal slide attachment further comprise snap-together members.

11. The lanyard of claim 10, wherein the snap-together members comprise plastic male and female members.

12. The lanyard of claim 11, wherein one of the other objects held by the attachment point is a key ring.

13. The lanyard of claim 11, wherein one of the other objects held by the attachment point is a badge clip.

14. The lanyard of claim 11, wherein one of the other objects held by the attachment point is a swivel hook.

15. The lanyard of claim 11, wherein one of the other objects held by the attachment point is a "J" hook.

16. The lanyard of claim 11, wherein one of the other objects held by the attachment point is a bulldog clip.

* * * * *